(12) United States Patent
Lee et al.

(10) Patent No.: US 8,053,108 B2
(45) Date of Patent: Nov. 8, 2011

(54) ORGANIC ELECTROLYTIC SOLUTION AND LITHIUM BATTERY EMPLOYING THE SAME

(75) Inventors: Doo-Yeon Lee, Yongin (KR); Hyo-Sug Lee, Yongin (KR)

(73) Assignee: Samsung SDI Co., Ltd., Suwon, Kyungki-Do (KR)

( * ) Notice: Subject to any disclaimer, the term of this patent is extended or adjusted under 35 U.S.C. 154(b) by 748 days.

(21) Appl. No.: 12/222,417

(22) Filed: Aug. 8, 2008

(65) Prior Publication Data

US 2009/0011340 A1  Jan. 8, 2009

Related U.S. Application Data

(62) Division of application No. 10/641,150, filed on Aug. 15, 2003, now abandoned.

(30) Foreign Application Priority Data

Aug. 31, 2002 (KR) .................................. 2002-52290

(51) Int. Cl.
*H01M 6/16* (2006.01)
(52) U.S. Cl. ......... 429/199; 429/337; 429/331; 429/326
(58) Field of Classification Search .................. 429/326, 429/331, 337, 338, 199; 252/62.2
See application file for complete search history.

(56) References Cited

U.S. PATENT DOCUMENTS 5,352,548 A   10/1994  Fujimoto et al.
(Continued)

FOREIGN PATENT DOCUMENTS
JP   05074486 A   3/1993
(Continued)

*Primary Examiner* — Tracy Dove
(74) *Attorney, Agent, or Firm* — Buchanan Ingersoll & Rooney PC

(57) ABSTRACT

An organic electrolytic solution comprising a nonaqueous solvent and a lithium salt, wherein the organic electrolytic solution comprises a compound of Formula 1 and at least one selected from compounds of Formulas 2 through 5:

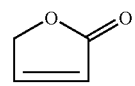

<Formula 1>

<Formula 2>

<Formula 3> wherein $R_1$ a C1~C10 alkoxy group,

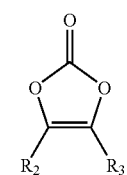

<Formula 4> wherein $R_2$ and $R_3$ are independently unsubstituted C1~C5 alkyl group or C1~C5 alkyl group substituted with halogen atom, <Formula 5> wherein n is an integer between 1 and 6.

22 Claims, 4 Drawing Sheets

| U.S. PATENT DOCUMENTS | | | | FOREIGN PATENT DOCUMENTS | | |
|---|---|---|---|---|---|---|
| 5,626,981 | A | 5/1997 | Simon et al. | JP | 11-273725 | 10/1999 |
| 5,712,059 | A | 1/1998 | Barker et al. | JP | 11273725 A | 10/1999 |
| 5,714,281 | A | 2/1998 | Naruse et al. | JP | 2000182666 A | 6/2000 |
| 6,048,637 | A | 4/2000 | Tsukahara et al. | JP | 2001-176548 | 6/2001 |
| 6,114,070 | A | 9/2000 | Yoshida et al. | JP | 2001-217001 | 8/2001 |
| 6,723,473 | B1 | 4/2004 | Oura et al. | JP | 2002-033127 | 1/2002 |

ORGANIC ELECTROLYTIC SOLUTION AND LITHIUM BATTERY EMPLOYING THE SAME

This application claims priority from Korean Patent Application No. 2002-52290, filed on Aug. 31, 2002, in the Korean Intellectual Property Office, the disclosure of which is incorporated herein in its entirety by reference.

BACKGROUND OF THE INVENTION

1. Field of the Invention

The present invention relates to an organic electrolytic solution and a lithium battery employing the same. More particularly, the invention relates to an organic electrolytic solution which can effectively suppress swelling of a battery, and a lithium battery employing the same.

2. Description of the Related Art

As portable electronic devices such as a video cameras, mobile phones or notebook type personal computers become lightweight and highly functional, extensive research into batteries used as power sources for driving the portable electronic devices is underway. In particular, rechargeable lithium secondary batteries have gained most attention and are vigorously studied because they have approximately three times a higher energy density per weight and are rapidly rechargeable, compared with conventional batteries such as Pb storage batteries, Ni—Cd batteries, Ni—H batteries or Ni—Zn batteries.

When a liquid electrolyte is used for a lithium secondary battery, various problems are encountered in view of safety, such as risk of fire due to leakage, damage to a battery due to evaporation. To avoid such problems, attempts to use a solid electrolyte, instead of a liquid electrolyte, have been made.

In general, since a solid electrolyte is free from risk of leakage of an electrolytic solution and easily prepared, compared to a liquid electrolyte, it has attracted much attention and extensive research is underway. Specifically, polymeric solid electrolytes are vigorously studied. Known polymeric solid electrolytes are classified into a solid type in which no organic electrolytic solution is contained at all, and a gel type in which an organic electrolytic solution is contained.

A lithium battery driven at a high operating voltage cannot employ a conventional aqueous electrolytic solution because lithium of an anode violently reacts with the aqueous solvent of the electrolytic solution. Thus, an organic electrolytic solution having a lithium salt dissolved in a nonaqueous organic solvent is used as an electrolytic solution for a lithium battery. As the organic solvent, a low-viscosity organic solvent having high ionic conductivity and a high dielectric constant is preferably used. However, a nonaqueous organic solvent satisfying these requirements does not exist in a single form. Thus, a mixed solvent of a highly dielectric organic solvent and a low viscosity organic solvent, can be used.

U.S. Pat. Nos. 6,114,070 and 6,048,637 disclose a method of increasing the ionic conductivity of an organic solvent using a mixed solvent of chain carbonate and cyclic carbonate, that is, a mixture of dimethylcarbonate or diethylcarbonate and ethylenecarbonate or propylene carbonate.

However, the mixed solvent can only be used at 120° C. or less but cannot used at a temperature higher than 120° C. because gas is generated due to vapor press, resulting in swelling of a battery.

U.S. Pat. Nos. 5,352,548, 5,712,059 and 5,714,281 disclose an electrolytic solution comprising an organic solvent having at least 20% vinylene carbonate (VC). However, since VC has a smaller dielectric constant than ethylene carbonate, propylene carbonate or γ-butyrolactone, charging/discharging performance and high-rate performance of a battery considerably deteriorate when it is used as a main solvent.

U.S. Pat. No. 5,626,981 discloses a method of forming Surface Electrolyte Interphase (SEI) on the surface of an anode by adding VC to an electrolytic solution at an initial charging/discharging cycle. Japanese Patent Laid-Open Publication No. 2002-33127 discloses uses of an additive for an electrolytic solution having electrochemically stability. Also, Japanese Patent Laid-Open Publication No. 2001-217001 describes use of an additive for a nonaqueous electrolytic solution of a secondary battery providing inflammability, good low-temperature performance and reduced interface resistance by using a phosphagen derivative.

Japanese Patent Laid-Open Publication No. 2001-176548 describes that the irreversible capacity of a lithium ion cell is minimized during the first cycle and cycle capacity of the cell is maintained at low temperature by employing a sulfuric ester additive.

However, when such batteries are stored at high temperature, the cell thickness exceeds an allowable limit, resulting in deformation of a battery pack, making use of the battery impossible.

Japanese Patent Laid-Open Publication No. 1999-273725 discloses improvement of a battery by use of 2(5H)-furanone. According to this patent, in a battery system using $LiCoO_2$ or $LiMn_2O_4$ as a cathode active material and natural graphite as an anode active material, when 0.1~5 wt % of 2(5H)-furanone is used, the charging/discharging efficiency of the battery is improved with repetition of 50 cycles. However, use of natural graphite as an anode active material lowers the overall efficiency of the battery.

SUMMARY OF THE INVENTION

The present invention provides an organic electrolytic solution capable of effectively suppressing swelling of a battery even with repeated charging/discharging cycles, and a lithium battery employing the lithium battery having improved reliability.

In an aspect of the present invention, there is provided a organic electrolytic solution comprising a nonaqueous solvent and a lithium salt, wherein the organic electrolytic solution comprises a compound of Formula 1 and at least one selected from compounds of Formulas 2 through 5:

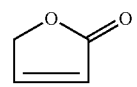

<Formula 1>

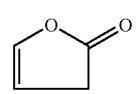

<Formula 2>

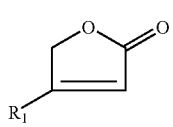

<Formula 3> wherein $R_1$ a C1~C10 alkoxy group,

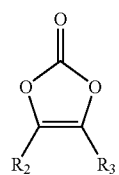
<Formula 4> wherein $R_2$ and $R_3$ are independently unsubstituted C1~C5 alkyl group or C1~C5 alkyl group substituted with halogen atom,

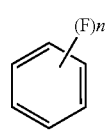
<Formula 5> wherein n is an integer between 1 and 6.

In the organic electrolytic solution, the total amount of the compound of Formula 1 and at least one among the compounds of Formulas 2 through 5 is preferably 0.01 to 1.5 parts by weight per 100 parts by weight of the nonaqueous solvent. Also, it is preferable that the compound of Formula 1 and at least one selected from compounds of Formulas 2 through 5 are mixed in a ratio of 1:1.5-1:40 by weight.

In the nonaqueous solvent, the cyclic carbonate solvent and the chain carbonate solvent are preferably mixed in a ratio of 1:1-1:4 by volume.

Examples of the chain carbonate solvent include at least one selected from the group consisting of dimethyl carbonate, ethyl methyl carbonate, diethyl carbonate, dipropyl carbonate, dimethoxyethane, diethoxyethane and a C3~C8 aliphatic ester derivative. Examples of the cyclic carbonate solvent include at least one selected from the group consisting of ethylene carbonate, propylene carbonate, butylene carbonate and γ-butyrolactone.

In particular, the compound of Formula 4 is preferably dimethyl vinylene carbonate and the compound of Formula 5 is preferably fluorobenzene, difluorobenzene, trifluorobenzene, tetrafluorobenzene, pentafluorobenzene or hexafluorobenzene.

The lithium salt composing the organic electrolytic solution according to the present invention is at least one selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$, and the concentration of the lithium salt is preferably about 0.5 to about 2 M.

In another aspect of the present invention, there is provided a lithium battery comprising a cathode, an anode and the organic electrolytic solution.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
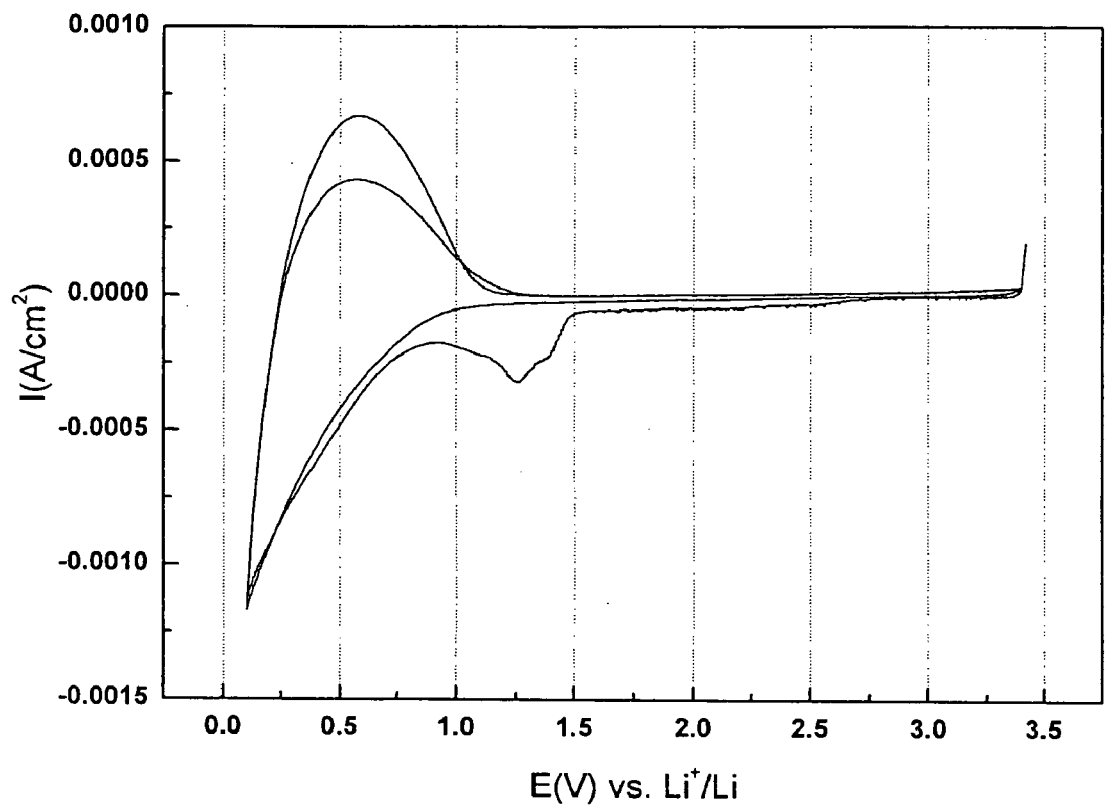
FIG. 1 illustrates electrochemical characteristics of an organic electrolytic solution in a lithium secondary battery prepared in Reference Example 1 of the present invention.

The organic electrolytic solution according to the present invention essentially includes a compound of Formula 1 as a well as a nonaqueous solvent and a lithium salt and optionally includes at least one selected from compounds of Formulas 2 through 5. Use of the organic electrolytic solution gives an SEI layer having a good interface characteristic on the surface of an anode, thereby effectively suppressing swelling of the battery without lowering ionic conductivity.

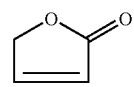
<Formula 1>

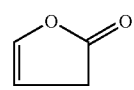
<Formula 2>

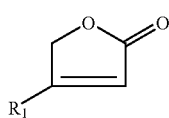
<Formula 3> wherein $R_1$ a C1~C10 alkoxy group,

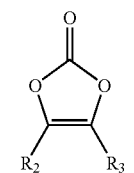
<Formula 4> wherein $R_2$ and $R_3$ are independently unsubstituted C1~C5 alkyl group or C1~C5 alkyl group substituted with halogen atom,

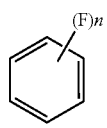

<Formula 5> wherein n is an integer between 1 and 6.

In Formula 3, concrete examples of $R_1$ include a methoxy group, an ethoxy group, a propyloxy group, a butyloxy group and a pentyloxy group. In Formula 2, concrete examples of $R_2$ and $R_3$ include a methyl group, an ethyl group, a propyl group, a butyl group and a pentyl group.

Examples of the compound of Formula 4 include dimethyl vinylene carbonate. Examples of the compound of Formula 5 include fluorobenzene, difluorobenzene, trifluorobenzene, tetrafluorobenzene, pentafluorobenzene and hexafluorobenzene.

In the organic electrolytic solution, the total amount of the compound of Formula 1 and at least one among the compounds of Formulas 2 through 5 is preferably 0.01 to 1.5 parts by weight per 100 parts by weight of the nonaqueous solvent. If the total amount of the compound of Formula 1 and at least one among the compounds of Formulas 2 through 5 is less than 0.01 parts by weight, the effect of suppressing swelling is not exhibited. If the total amount of the compound of Formula 1 and at least one among the compounds of Formulas 2 through 5 is greater than 1.5 parts by weight, the capacity and cycle performance of a battery undesirably deteriorate.

Also, it is preferable that the compound of Formula 1 and at least one selected from compounds of Formulas 2 through 5 are mixed in a ratio of 1:1.5-1:40 by weight. If the proportion of at least one selected from compounds of Formulas 2 through 5 to the compound of Formula 1 exceeds the range specified, the capacity and cycle performance of a battery are lowered. If the proportion of at least one selected from compounds of Formulas 2 through 5 to the compound of Formula 1 is less than the range specified above, the effect of suppressing swelling is not exhibited.

The nonaqueous solvent includes a cyclic carbonate solvent as a highly dielectric solvent and a chain carbonate solvent as low boiling point solvent. Examples of the highly dielectric solvent include ethylene carbonate, propylene carbonate, butylene carbonate, γ-butyrolactone, and mixtures thereof. Examples of the low boiling point solvent include dimethyl carbonate, ethyl methyl carbonate, diethyl carbonate, dipropyl carbonate, dimethoxyethane, diethoxyethane, C3~C8 aliphatic ester derivatives and mixtures thereof.

The cyclic carbonate solvent and the chain carbonate solvent are mixed in a ratio of 1:1-1:4 by volume. If the proportion of the chain carbonate solvent (low boiling point solvent) to the cyclic carbonate solvent (high dielectric constant solvent) exceeds the range specified above, the charging/discharging efficiency and capacity of a battery are reduced. If the proportion of the chain carbonate solvent (low boiling point solvent) to the cyclic carbonate solvent (high dielectric constant solvent) is less than the range specified above, the low temperature performance of a battery is rapidly lowered.

Any lithium salt generally used in the field can be used. For example, at least one compound selected from the group consisting of $LiClO_4$, $LiCF_3SO_3$, $LiPF_6$, $LiN(CF_3SO_2)$, $LiBF_4$, $LiC(CF_3SO_2)_3$ and $LiN(C_2F_5SO_2)_2$ can be used as the lithium salt. It is preferable that the concentration of the lithium salt in the electrolytic solution is in a range of 0.5-2.0 M.

A lithium battery employing the organic electrolytic solution according to the present invention and a manufacturing method thereof will now be described. The type of the lithium battery according to the present invention is not particularly limited and the invention can be applied to both a lithium secondary battery such as a lithium ion battery or a lithium ion polymer battery and a lithium primary battery.

First, a cathode active material, a conductive agent, a binder and a solvent are mixed to prepare a cathode active material composition. The cathode active material composition is directly coated on an aluminum current collector and dried to prepare a cathode plate. Alternatively, the cathode active material composition is cast on a separate support, and a film peeled off from the support is laminated on the aluminum current collector to prepare a cathode.

A lithium containing metal oxide, e.g., $LiCoO_2$, $LiMn_xO_{2x}$, or $LiNi_{1-x}Mn_xO_{2x}$ (x=1, 2), sulfur or a sulfur containing compound is preferably used as the cathode active material. Carbon black is used as the conductive agent. Examples of the binder include vinylidenefluoride/hexafluoropropylene copolymer, polyvinylidenefluoride, polyacylornitrile, polymethylmethacrylate, polytetrafluoroethylene and mixtures thereof. Also, N-methylpyrrolidone or acetone is used as the solvent. The cathode active material, the conductive agent, the binder and the solvent are used in amounts that are generally used in the field of a lithium battery.

Like in the manufacture of the cathode plate, an anode active material, a conductive agent, a binder and a solvent are mixed to prepare an anode active material composition. The anode active material composition is directly coated on a copper current collector or cast on a separate support. An anode active material film peeled off from the support is laminated on the copper current collector to prepare an anode. As the anode active material, lithium metal, a lithium alloy, a carbonaceous material or graphite is used. The conductive agent, the binder and the solvent used in the anode active material composition are the same as those used in the cathode active material composition. In some cases, a plasticizer may be further added to each of the cathode active material composition and the anode active material composition in order to form pores in each electrode plate.

Any separator that is generally used for a lithium battery can be used as the separator. Specifically, a separator that is less resistive to ion migration of an electrolyte and has high capability of impregnating an electrolytic solution is preferred. In more detail, at least one selected from the group consisting of glass fiber, polyester, Teflon, polyethylene, polypropylene, polytetrafluoroethylene (PTFE), and combinations thereof may be used in either form of a non-woven or woven separator. That is to say, in the case of a lithium ion battery, a windable separator made of a material such as polyethylene or polypropylene. In the case of a lithium ion polymer battery, a separator having high capability of impregnating an organic electrolytic solution is used. These separators can be manufactured as follows.

A polymer resin, a filler and a solvent are mixed to prepare a separator composition.

The separator composition is directly coated on an electrode and dried to form a separator film. Alternatively, the separator composition is cast on a support and dried, followed by peeling off the separator film from the support. The separator film is laminated on the electrode.

The polymer resin is not specifically limited and any material that is used for a binder of an electrode plate can be used. Examples of the polymer resin useful in the present invention include a vinylidenefluoride/hexafluoropropylene copolymer, polyvinylidenefluoride, polyacrylonitrile, polymethylmethacrylate and mixtures thereof. Particularly, a vinylidene-fluoride-hexafluoropropylene copolymer having 8 to 25% by weight of hexafluoropropylene is used.

The separator is interposed between the cathode and the anode to form a battery assembly. The battery assembly is wound or folded to then be put into a cylindrical battery case or a rectangular battery case, followed by injecting the organic electrolytic solution, thereby completing the lithium battery according to the present invention.

In the present invention, the term "parts by volume" indicates relative volume.

The present invention will be described in greater detail with reference to the following examples. The following examples are for illustrative purposes and are not intended to limit the scope of the invention.

Preparation Example 1

30 parts by volume ethylene carbonate, 5 parts by volume dimethyl carbonate, 55 parts by volume ethylmethyl carbonate, 10 parts by volume fluorobenzene (10.24 parts by weight, density: 1.024) which is one of compounds of Formula 5, 0.35 parts by weight 2(5H)-furanone of Formula 1 were mixed and $LiPF_6$ was added thereto to prepare a 1.15M organic electrolytic solution.

Preparation Example 2

An organic electrolytic solution was prepared in the same manner as in Preparation Example 1, except that 0.3 parts by weight 2(5H)-furanone of Formula 1 was used and 0.05 parts by weight 2(3H)-furanone of Formula 2 was further added.

Preparation Example 3

An organic electrolytic solution was prepared in the same manner as in Preparation Example 1, except that 0.3 parts by weight 2(5H)-furanone of Formula 1 was used and 0.05 parts by weight 4-methoxy-2(5H)-furanone of Formula 3 was further added.

Preparation Example 4

An organic electrolytic solution was prepared in the same manner as in Preparation Example 1, except that 0.3 parts by weight 2(5H)-furanone of Formula 1 was used and 0.05 parts by weight 4,5-dimethyl-vinylene carbonate of Formula 4 was further added.

Comparative Preparation Example 1

30 parts by volume ethylene carbonate, 5 parts by volume dimethyl carbonate, 55 parts by volume ethylmethyl carbonate and 10 parts by volume fluorobenzene were mixed and $LiPF_6$ was added thereto to prepare a 1.15 M organic electrolytic solution.

Comparative Preparation Example 2

30 parts by volume ethylene carbonate, 5 parts by volume dimethyl carbonate, 55 parts by volume ethylmethylcarbonate and 0.35 parts by volume vinyl sulfone were mixed and $LiPF_6$ was added thereto to prepare a 1.15 M organic electrolytic solution.

Reference Preparation Example 1

50 parts by volume ethylene carbonate, 50 parts by volume propylene carbonate and 6 parts by weight 2(5H)-furanone of Formula 1 were mixed and $LiPF_6$ was added thereto to prepare a 1.2 M organic electrolytic solution.

Example 1

96 parts by weight $LiCoO_2$, 2 wt % polyvinylidenefluoride (PVdF) and 2 parts by weight a conductive agent for facilitating electron migration were mixed and N-methylpyrrolidone (NMP) and ceramic balls were added thereto. The resulting mixture was placed in a 200 ml plastic bottle and mixed well for 10 hours to prepare a cathode active material forming composition.

The cathode active material forming composition was cast on a 15 μm thick aluminum foil using a doctor blade having a gap of 250 μm, and dried at an oven maintained at approximately 110° C. for approximately 12 hours to completely evaporate NMP, followed by roll pressing, thereby obtaining a 95 μm thick cathode.

Separately, 93 parts by weight graphite-based MCMB 2528 (Osaka Gas Co.) as an anode active material, 7 parts by weight PVdF as a binder and NMP were well mixed, and ceramic balls are added thereto, followed by mixing well for approximately 10 hours to prepare an anode active material forming composition.

The anode active material forming composition was cast on a 19 μm thick copper foil using a doctor blade having a gap of 300 μm, and dried at an oven maintained at approximately 90° C. for approximately 10 hours to completely evaporate NMP, followed by roll pressing, thereby obtaining a 120 μm thick anode.

A 20 μm thick polyethylene/polypropylene microporous layer (Hoest Cellanese, USA) was used as the separator. The separator was interposed between the cathode and the anode, thereby fabricating a battery assembly. Next, the battery assembly was accommodated in a battery case and the organic electrolytic solution prepared in Preparation Example 1, 2, 3 or 4 was impregnated into the battery case, thereby manufacturing a rectangular lithium secondary battery having a capacity of 900 mAh. The assembled battery had a thickness of 5.9 mm. In order to evaluate characteristics of the organic electrolytic solution prepared in Preparation Example 1, 2, 3 or 4, four batteries were prepared in the above-described manner.

Example 2

A polymer electrolyte forming composition was prepared in such a manner that 15 g of a monomer solution for forming a VdF-HFP copolymer was put in a 250 ml bottle containing 100 ml each electrolytic solution prepared in Preparation Example 1, 2, 3 and 4, and the resultant product was left at an oven maintained at 80° C. for approximately 1 hour, followed by violently stirring for complete dissolution.

The cathode and the anode were fabricated in the same manner as in Example 1.

The cathode was placed on a glass substrate, the polymer electrolyte forming composition was applied thereon and cast using a doctor blade having a thickness of 200 μm and the resultant structure was allowed to stand under a dry atmosphere in which moisture was adjusted to 15 ppm or less for approximately one minute, thereby forming a polymer electrolyte coated cathode.

Like in the cathode, the anode was placed on a glass substrate, the polymer electrolyte forming composition was cast on the resulting anode, and resultant structure was allowed to stand under a dry atmosphere for approximately one minute, thereby forming a polymer electrolyte coated anode.

Thereafter, the polymer electrolyte coated cathode and anode were wound in a jelly-roll type, followed by pressing using a hot pressing having a pressure of approximately 96 N/cm² for approximately one minute, thereby manufacturing a rectangular lithium secondary battery having a capacity of 900 mAh.

Comparative Example 1

A rectangular lithium secondary battery was manufactured in the same manner as in Example 1, except that the organic electrolytic solution prepared in Comparative Preparation Example 1 or 2 was used instead of the organic electrolytic solution prepared in Preparation Example 1, 2, 3 or 4.

Comparative Example 2

A rectangular lithium secondary battery was manufactured in the same manner as in Example 2, except that the organic electrolytic solution prepared in Comparative Preparation Example 1 or 2 was used instead of the organic electrolytic solution prepared in Preparation Example 1, 2, 3 or 4.

Reference Example 1

A three-electrode system (Li/Carbon/Li) battery was manufactured using the organic electrolytic solution prepared in Reference Preparation Example 1, instead of the organic electrolytic solution prepared in Preparation Example 1, 2, 3 or 4.

In the lithium secondary battery manufactured in Reference Example 1, electrochemical characteristics of the organic electrolytic solution prepared in Reference Preparation Example 1 were evaluated by cyclic voltametry. Here, a scanning rate was approximately 1 mV/sec.

Evaluation results of the electrochemical characteristics are shown in FIG. 1.

Referring to FIG. 1, clear peaks appeared at approximately 1.2 V due to presence of 2(5H)-furanone of Formula 1, suggesting that 2(5H)-furanone of Formula 1 added to the organic electrolytic solution was reduced faster than other components to form an SEI on the surface of the anode, thereby suppressing an evaporation pressure of the electrolytic solution.

The lithium secondary batteries prepared in Example 2 and Comparative Example 2 each having a capacity of 900 mAh were charged with a current rate of 1 C, stored at a constant-temperature, constant humidity tank maintained at approximately 85° C. for approximately 4 hours, and discharged with a current rate of 0.5 C to reach 3.0 V. Then, each recovery capacity was measured. The measurement results are shown in Table 1.

TABLE 1

|  | Discharge capacity (mAh) | Capacity recovery ratio (%) |
| --- | --- | --- |
| Example 2 (Electrolytic solution of Preparation Example 1) | 820.6 | 91.40 |
| Example 2 (Electrolytic solution of Preparation Example 2) | 814.70 | 90.51 |
| Example 2 (Electrolytic solution of Preparation Example 3) | 828 | 92.00 |
| Example 2 (Electrolytic solution of Preparation Example 4) | 832.9 | 92.70 |
| Comparative Example 2 (Electrolytic solution of Comparative Preparation Example 1) | 813.8 | 90.42 |
| Comparative Example 2 (Electrolytic solution of Comparative Preparation Example 2) | 814.5 | 90.50 |

It was understood from Table 1 that the capacity recovery ratio of the lithium secondary battery of Example 2 was 1-3% higher than that of the lithium secondary battery of Comparative Example 2. The lithium secondary battery using the electrolytic solution of Comparative Example 2 had substantially the same capacity recovery ratio as that of the lithium secondary battery using the electrolytic solution of Comparative Preparation Example 1.

After measuring the recovery capacities of the lithium secondary batteries manufactured in Example 2 and Comparative Example 2, each having a capacity of 900 mAh, in order to evaluate charging/discharging characteristics, the batteries were charged again with a current rate of 1 C under the constant-current, constant-voltage conditions until a potential reached 4.2 V, and then discharged with a current rate of 1 C under the constant-current condition until a potential reached 3.0 V. The results are shown in FIG. 5.

Figure 5:
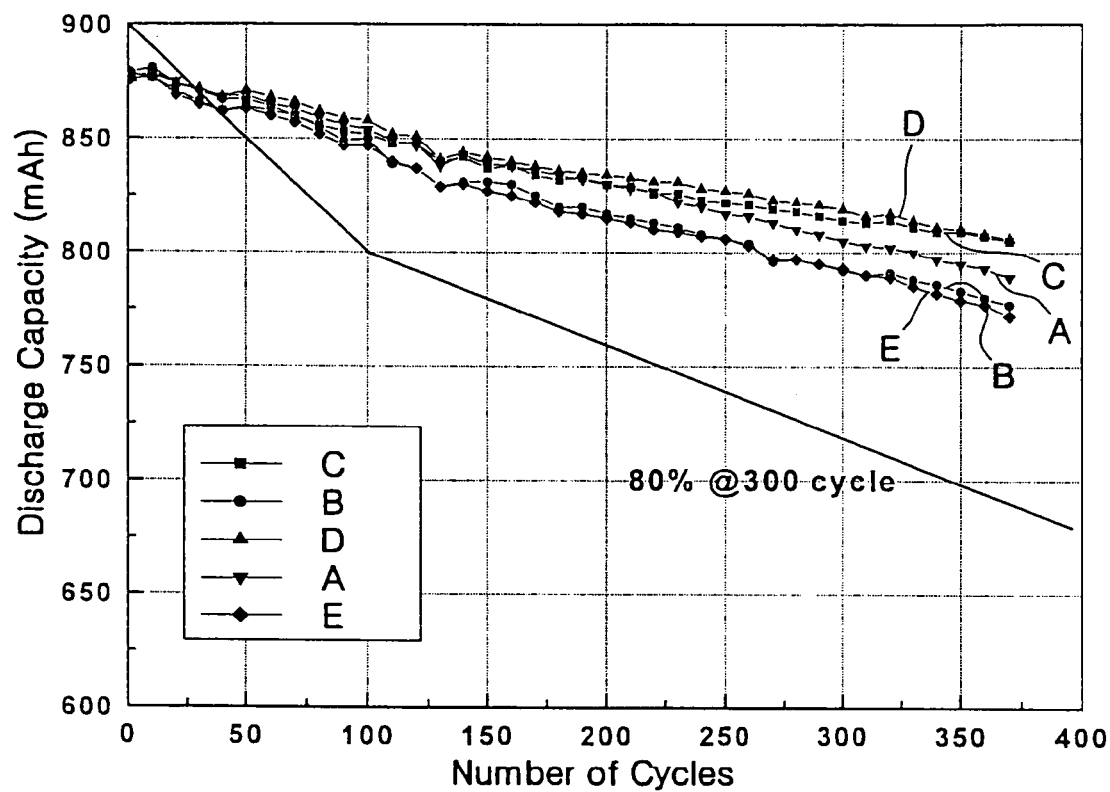
FIG. 5 is a graphical representation illustrating cycle performance of lithium secondary batteries manufactured in Example 2 of the present invention and Comparative Example 2.

Referring to FIG. 5, not only the lithium battery using 2(5H)-furanone but also the lithium batteries using the electrolytic solution prepared in Preparation Examples 2, 3 and 4 exhibited high charging/discharging performance, that is, over 80% of the initial capacity, after repetition of 300 cycles.

The rectangular lithium secondary batteries manufactured in Example 2 and Comparative Example 2 were charged with a current rate of 0.2 C under the constant-current, constant-voltage conditions until a potential reached 4.2 V, and discharged with a current rate of 0.2 C under a constant-current condition until a potential reached 3.0 V. Then, each cell thickness was measured, and the result thereof is shown in FIG. 2, in which A, B, C and D indicate thicknesses of the lithium secondary batteries using the organic electrolytic solutions prepared in Preparation Examples 1, 2, 3 and 4 of Example 2, respectively, and E indicates a thickness of the lithium secondary battery using organic electrolytic solution prepared in Comparative Preparation Example 2 of Comparative Example 2.

Figure 2:
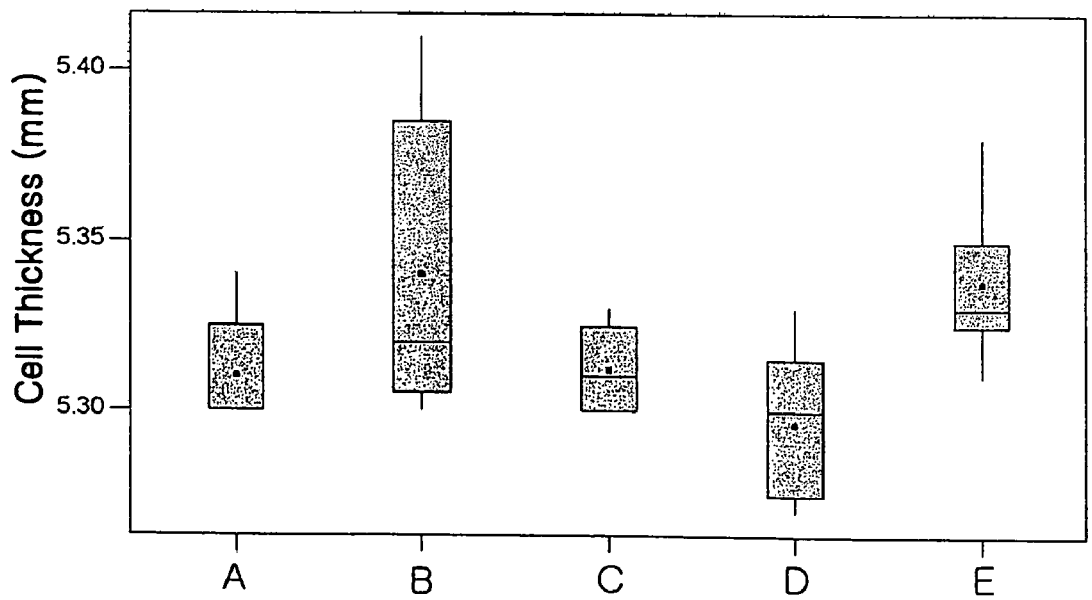
FIG. 2 is a graphical representation illustrating cell thickness after charging and discharging in lithium secondary batteries prepared in Example 2 of the present invention and Comparative Example 2.

Referring to FIG. 2, the batteries using the organic electrolytic solutions prepared in Preparation Examples 1, 2, 3 and 4 showed an increase in the cell thickness within the standard limit of 5.4 mm, in which swelling suppression is effectuated.

Figure 3:
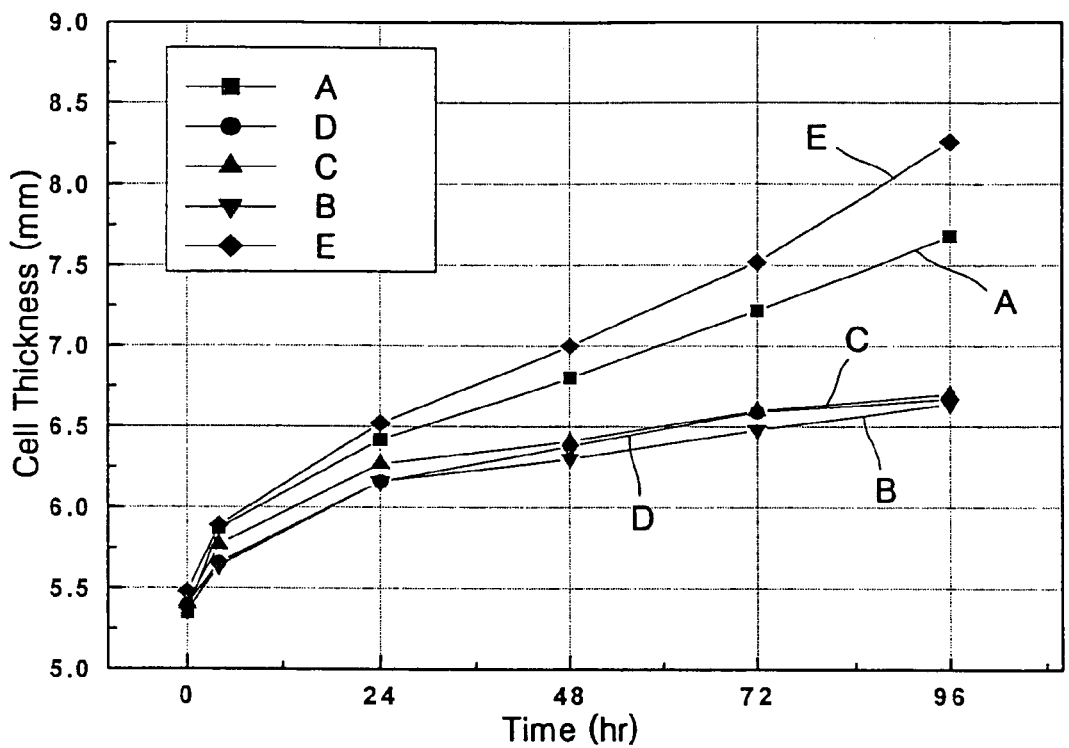
FIG. 3 is a graphical representation illustrating a change in cell thickness after storage at 85° C. for 4 hours in lithium secondary batteries prepared in Example 2 of the present invention and Comparative Example 2.

After storing the rectangular lithium secondary batteries manufactured in Example 2 and Comparative Example 2 at 85° C. for 4 hours, each cell thickness was measured, and the result is shown in FIG. 3, in which A, B, C, D and E are the same as those in FIG. 2.

Referring to FIG. 3, the lithium secondary batteries using the electrolytic solutions prepared in Preparation Examples 1, 2, 3 and 4 Example 2 were more effective in suppressing an increase in the swelling suppression thickness than the lithium secondary battery using the electrolytic solution prepared in Comparative Example 2.

The rectangular lithium secondary batteries manufactured in Example 2 and Comparative Example 2 were charged with a current rate of 0.5 C under the constant-current, constant-voltage conditions until a potential reached 4.2 V, stored at −20° C. for 16 hours and discharged with a current rate of 0.2 C under the constant-current condition until the potential reached 2.75 V. Then, charging/discharging characteristics were evaluated, and the results thereof are shown in FIG. 4, in which A, B, C, D and E are the same as those in FIG. 2.

Figure 4:
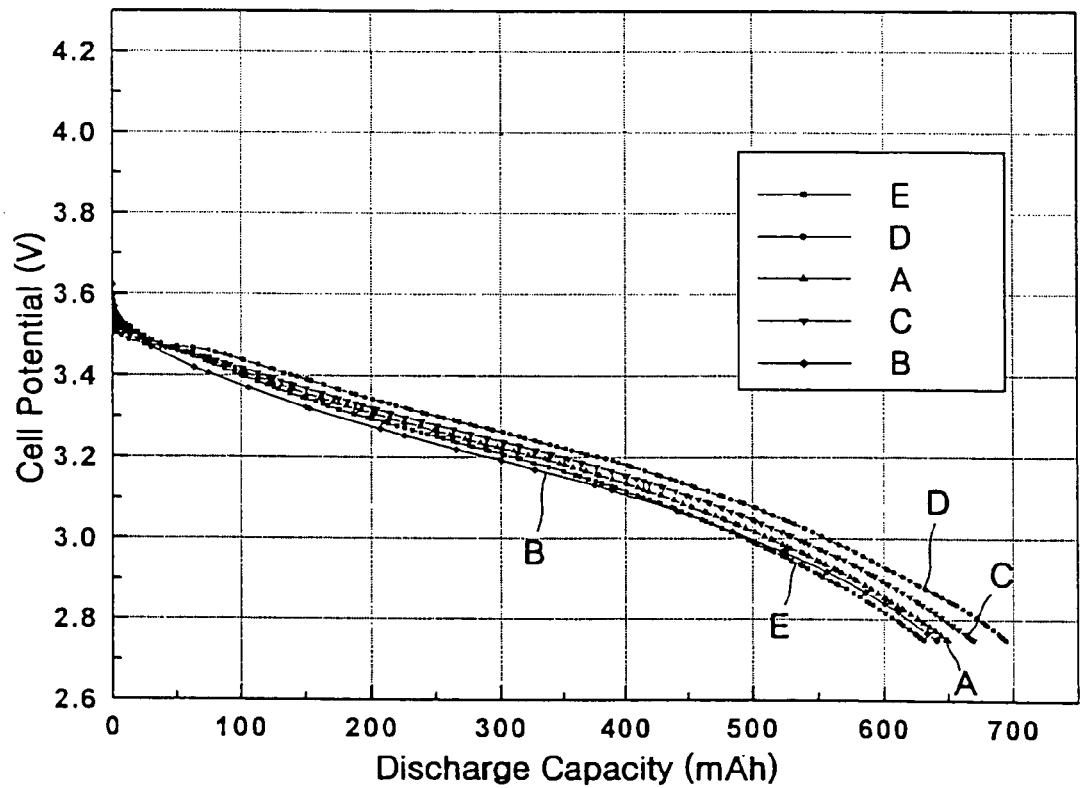
FIG. 4 is a graphical representation illustrating charging/discharging performance of lithium secondary batteries manufactured in Example 2 of the present invention and Comparative Example 2.

Referring to FIG. 4, the batteries using additives like in Preparation Examples 2, 3 and 4 exhibited better low-temperature performance than the battery using 2(5H)-furanone only like in Preparation Example 1.

The rectangular lithium secondary batteries manufactured in Example 2 and Comparative Example 2 were charged with a current rate of 1 C under the constant-current, constant-voltage conditions until a potential reached 4.2 V, stored for 10 minutes and discharged with a current rate of 1 C under the constant-current condition until the potential reached 2.75 V. Then, a change in the discharge capacity depending on the number of cycles was investigated, and the results thereof are shown in FIG. 5, in which A, B, C, D and E are the same as those in FIG. 2.

Referring to FIG. 5, the lithium secondary battery of Example 2 had better cycle performance than the lithium secondary battery of Comparative Example 2. In FIG. 5, the black solid line indicates that 80% of the initial capacity is maintained at the $300^{th}$ cycle.

Use of the organic electrolytic solution according to the present invention allows swelling of a battery to be effectively suppressed even after repeating charging/discharging cycles after forming the battery at room temperature, charging under standard conditions and storing at high temperature. Also, a highly reliable lithium battery having a high capacity recovery ratio even after stored at high temperature can be attained.

Figure 6:
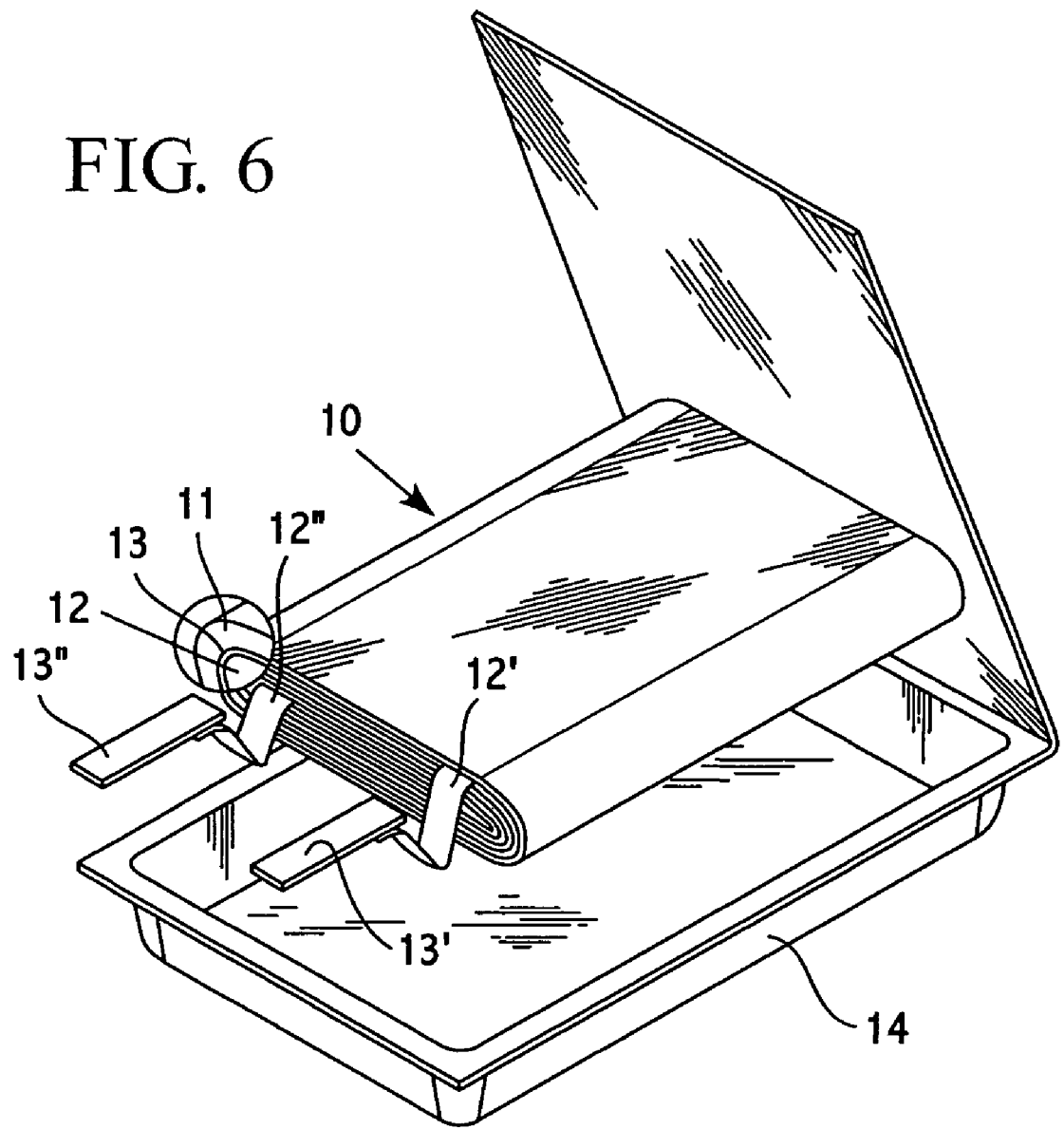
FIG. 6 is an exploded view showing an example of a lithium battery using a pouch as a case.

FIG. 6 is an exploded perspective view showing an example of a lithium battery using a pouch as a case.

Referring to FIG. 6, a lithium ion battery includes an electrode assembly 10 having a cathode 11, an anode 12 and a separator 13, and a case 14 surrounding and hermetically sealing the electrode assembly 10. Here, the electrode assembly 10 is formed such that the separator 13 is interposed between the cathode 11 and the anode 12 and wound. A cathode tap 12" and an anode tap 12', serving as electrical passageways between the electrode assembly 10 and the outside, are drawn from the cathode 11 and the anode 12, respectively, to form electrode terminals 13" and 13'. In FIG. 6, an electrolytic solution is not shown.

The present invention has been described by way of exemplary embodiments to which it is not limited. Variation and modifications will occur to those skilled in the art without departing from the scope of the present invention as recited in the claims appended hereto.

We claim:

1. An organic electrolytic solution comprising a nonaqueous solvent including a cyclic carbonate and a chain carbonate and a lithium salt, wherein the organic electrolytic solution comprises (i) a compound of Formula 1, (ii) a compound of Formula 5, and (iii) at least one selected from the group consisting of Formula 3 and Formula 4:

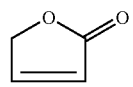

Formula 1

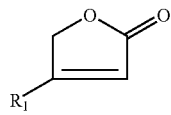

Formula 3 wherein $R_1$ a $C_1$ to $C_{10}$ alkoxy group,

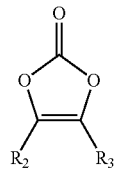

Formula 4 wherein $R_2$ and $R_3$ are independently an unsubstituted $C_1$ to $C_5$ alkyl group or a $C_1$ to $C_5$ alkyl group substituted with halogen atom,

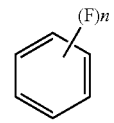

Formula 5 wherein n is an integer between 1 and 6.

2. The organic electrolytic solution of claim 1, wherein the chain carbonate solvent is at least one selected from the group consisting of dimethyl carbonate, ethyl methyl carbonate, diethyl carbonate, dipropyl carbonate, dimethoxyethane, diethoxyethane, and a $C_3$ to $C_8$ aliphatic ester.

3. The organic electrolytic solution of claim 1, wherein the cyclic carbonate solvent is at least one selected from the group consisting of ethylene carbonate, propylene carbonate, butylene carbonate, and γ-butyrolactone.

4. The organic electrolytic solution of claim 1, wherein the compound of Formula 4 is 4,5-dimethyl-vinylene carbonate.

5. The organic electrolytic solution of claim 1, wherein the compound of Formula 5 is fluorobenzene, difluorobenzene, trifluorobenzene, tetrafluorobenzene, pentafluorobenzene or hexafluorobenzene.

6. The organic electrolytic solution of claim 1, wherein the lithium salt is at least one selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_6SO_2)_2$, and the concentration of the lithium salt is about 0.5 to about 2 M.

7. A lithium battery comprising:
a cathode;
an anode; and
an organic electrolytic solution comprising a nonaqueous solvent including a cyclic carbonate and a chain carbonate and a lithium salt, wherein the organic electrolytic solution comprises (i) a compound of Formula 1, (ii) a compound of Formula 5, and at least one selected from the group consisting of Formula 3 and Formula 4:

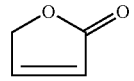

Formula 1

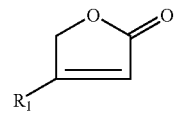

Formula 3 wherein $R_1$ a $C_1$ to $C_{10}$ alkoxy group,

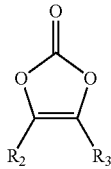

Formula 4 wherein $R_2$ and $R_3$ are independently an unsubstituted $C_1$ to $C_5$ alkyl group or a $C_1$ to $C_5$ alkyl group substituted with halogen atom,

Formula 5 wherein n is an integer between 1 and 6.

8. The organic electrolytic solution of claim 1, wherein the at least one selected from the group consisting of Formula 3 and Formula 4 is a compound of Formula 3.

9. The organic electrolytic solution of claim 1, wherein the at least one selected from the group consisting of Formula 3 and Formula 4 is a compound of Formula 4.

10. The organic electrolytic solution of claim 1, wherein the cyclic carbonate is ethylene carbonate and the chain carbonate comprises dimethyl carbonate.

11. The lithium battery of claim 7, wherein the at least one selected from the group consisting of Formula 3 and Formula 4 is a compound of Formula 3.

12. The lithium battery of claim 7, wherein the at least one selected from the group consisting of Formula 3 and Formula 4 is a compound of Formula 4.

13. The lithium battery of claim 7, wherein the chain carbonate solvent is at least one selected from the group consisting of dimethyl carbonate, ethyl methyl carbonate, diethyl carbonate, dipropryl carbonate, dimethoxyethane, diethoxyethane, and a $C_3$ to $C_8$ aliphatic ester.

14. The lithium battery of claim 7, wherein the cyclic carbonate solvent is at least one selected from the group consisting of ethylene carbonate, propylene carbonate, butylene carbonate, and γ-butyrolactone.

15. The lithium battery of claim 7, wherein the compound of Formula 4 is 4,5-dimethyl-vinylene carbonate.

16. The lithium battery of claim 7, wherein the compound of Formula 5 is fluorobenzene, difluorobenzene, trifluorobenzene, tetrafluorobenzene, pentafluorobenzene or hexafluorobenzene.

17. The lithium battery of claim 7, wherein the lithium salt is at least one selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_6SO_2)_2$, and the concentration of the lithium salt is about 0.5 to about 2 M.

18. The lithium battery of claim 7, wherein the organic electrolytic solution comprises ethylene carbonate as the cyclic carbonate and dimethyl carbonate as the chain carbonate.

19. An organic electrolytic solution of claim 1, wherein the total amount of the compound of Formula 1, the compound of Formula 5, and at least one of the compound of Formula 3 and the compound of Formula 4 is 0.01 to 1.5 parts by weight to 100 parts by weight of the nonaqueous solvent.

20. An organic electrolytic solution of claim 1, wherein the weight ratio of the compound of Formula 1 to the compound of Formula 5 and at least one compound of Formula 3 and the compound of Formula 4 is 1:1.5 to 1:40 by weight.

21. A lithium battery according to claim 7, wherein in the organic electrolytic solution to total amount of the compound of Formula 1, the compound of Formula 5, and at least one of the compound of Formula 3 and the compound of Formula 4 is 0.01 to 1.5 parts by weight to 100 parts by weight of the nonaqueous solvent.

22. A lithium battery according to claim 7, wherein the weight ratio within the organic electrolytic solution of the compound of Formula 1 to the compound of Formula 5 and at least one compound of Formula 3 and the compound of Formula 4 is 1:1.5 to 1:40 by weight.

\* \* \* \* \*